(12) United States Patent
Rinaldi

(10) Patent No.: US 6,637,019 B1
(45) Date of Patent: Oct. 21, 2003

(54) SOFTWARE MODELING OF COMPUTER HARDWARE

(75) Inventor: Mark Anthony Rinaldi, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/546,458

(22) Filed: Apr. 10, 2000

(51) Int. Cl.[7] ................................................ G06F 9/44
(52) U.S. Cl. .................... 717/104; 717/107; 703/21; 703/23
(58) Field of Search ........................ 717/109, 104–107; 703/20–23, 26, 27

(56) References Cited

U.S. PATENT DOCUMENTS

| | | | | |
|---|---|---|---|---|
| 5,386,568 A | * | 1/1995 | Wold et al. | 345/769 |
| 5,946,693 A | * | 8/1999 | Mizuyama et al. | 345/804 |
| 5,949,998 A | * | 9/1999 | Fowlow et al. | 709/328 |
| 5,991,535 A | * | 11/1999 | Fowlow et al. | 717/107 |
| 6,083,277 A | * | 7/2000 | Fowlow et al. | 345/769 |

OTHER PUBLICATIONS

"Structured Computer Organization: Second Edition", by Andrew S. Tanenbaum, 1984.*
"Visual Object–Oriented Programming", by Margaret M. Burnett, 1995.*

* cited by examiner

Primary Examiner—Gregory Morse
Assistant Examiner—Kenneth A Gross
(74) Attorney, Agent, or Firm—Driggs, Lucas, Brubaker & Hogg; James A. Lucas

(57) ABSTRACT

Software modeling of hardware components is conducted by partitioning the software into components or parts that are comparable to the components of the hardware. The parts are then configured through the use of plugs and connectors to replicate the hardware. The plugs are either import, export, splitter or compound plugs. The connectors ensure that the parts are capable of interfacing with one another in a communicative manner.

10 Claims, 5 Drawing Sheets

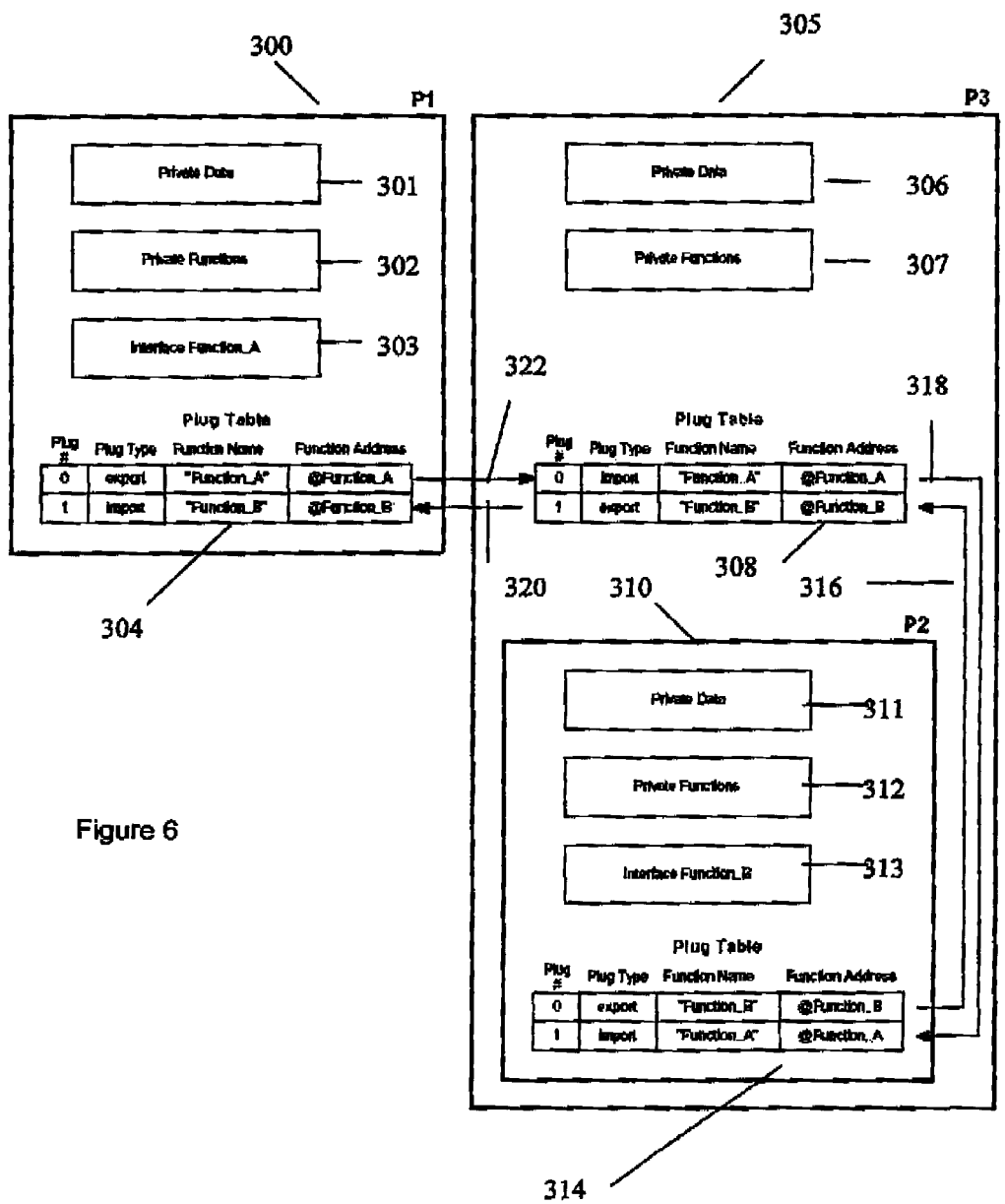

SOFTWARE MODELING OF COMPUTER HARDWARE

FIELD OF THE INVENTION

This invention relates to a software system that permits the software modeling of a plurality of hardware components and their hardware connections with a corresponding plurality of software components and connections.

BACKGROUND OF THE INVENTION

Software components are widely used in the assembly of complex software systems capable of performing detailed functions. A software component comprises a body of code which implements some software function and one or more public software interfaces which define the manner in which that component communicates with other components. In this manner components need not be aware of the internal implementation details of other components so long as they communicate with one another using the public interfaces. This arrangement is similar to the manner in which complex hardware systems are constructed in that two hardware components can successfully communicate with one another over a common hardware interface so long as they both adhere to the specifications (both electrical and logical) of that interface.

Often the development of a complex hardware system requires the development of a corresponding software simulation model which simulates the behavior of the hardware system. This software model is used by system developers to design and verify a system prior to availability of the actual hardware. This should not to be confused with hardware simulation models developed for the purposes of low level hardware design and verification as these simulation models tend run between 1000 and 10,000 time slower and are therefore unsuitable for system simulation. Hardware simulation models have the advantage that they are structurally equivalent to the hardware that is being modeled. In other words there is a one to one correspondence between hardware components and connections in the hardware and their software equivalents in the simulation model. This is a significant main contributor to the slower performance of hardware simulations. Because they do not enforce structural equivalency, software simulations can be much faster than their hardware counterparts. However, the loss of one-to-one correspondence between components and connections in the hardware and corresponding components and connections in the software model, makes it more difficult to modify the software model in order to track changes in the hardware.

SUMMARY OF THE INVENTION

It is an object of the present invention to be able to connect software elements with one another without any penalties in performance.

Another object is to improve the productivity in the development of complex software systems.

Yet another object is to permit the us of software macros in various combinations to mimic hardware architecture.

Still another object is to permit the assembly of software macros in a simple yet effective manner while at the same time concealing the software contents.

One further object is to permit connections to be made between software components without penalties in performance even though a software component may be embedded deep within a software system.

These and other objects and advantages that will become apparent to one skilled in the art upon a reading of the following description are achieved in the manner to be hereinafter described in greater detail.

For purposes of this description, software part, software component and software macro are used interchangeably throughout.

The present invention relates to a system and method for software modeling of hardware architecture. The system includes a software part corresponding to an individual component of the hardware architecture, said software part including a set of interface code functions. It also includes a data structure associated with the software part comprising a plug table containing one or more plugs. Each plug includes an assigned plug identifier, a description of the plug type, the name of a given interface code function accessed by the plug, and an address for the given function if the function is available for export from the software part. The plug type can be an export plug, an import plug, a splitter plug or a compound plug. When the plug is an export plug, the system and process includes a second software part, a plug table associated with the second software part and containing one or more plugs including an import plug, and a connector joining the export plug in the plug table of the first software part with an import plug in the plug table of the second software part for transfer of the code function address from the first software part into the second software part. The system and method can also include means for inputting the address of the given code function into the table of the second software part upon completion of a connection.

The system and method are typically used when the first and the second software parts belong to a software hierarchical configuration including additional plugs and connectors for each software part in the hierarchy for passing interface code functions from the first and second software parts to the software parts at the top of the software hierarchy. For purposes of the following discussion, the first and second software parts will be described respectively as the left software part and the right software part.

One embodiment of the invention utilizes a left software part and a right software part and means for creating a connection between the left part and the right part through an import plug, an export plug and a connector. A plug table is associated with the left software part and includes a left plug number for the left plug type. A plug table is associated with the right software part and includes a right plug number for the right plug type. A connection table is associated with the connector and contains data defining the left plug type and the right plug type and an address of the connection functions. The system utilizes a protocol for searching the connection table for an import/export match between the plugs corresponding to the part location of a function address. If a match is found, the system includes means for executing a connection function. If no match is found, the system terminates the connection function.

The invention also contemplates the use of a process for creating a connection between a left software part and the right software part through an import plug, an export plug and a connector. The process comprises the steps of finding a left plug type for the left plug number from a plug table associated with the left software part and finding a right plug number for the right plug type plug from the table associated with the right software part. A connection table associated with the connector containing data defining the left plug type and the right plug type is then searched for an address of the connection functions for an import/export match between the plugs corresponding to the part location of a function address. If a match is found, a connection function is executed, and if a match is not found the connection function is terminated.

If the connection is made, the function is transferred between the left software part and the right software part through the connector if a function match is found. This includes finding the left function name from the plug table in the left part; finding the right function name from the plug table in the right part; copying the function address from the plug table of the part having an export plug to the plug table of the part having an import plug, or terminating the process if the names do not match.

The invention also contemplates a machine readable media comprising an import plug, a connector, and an export plug that operates to connect a first software part to a second software part to permit the software simulation of a hardware system. The media preferably is in the form of a magnetic disc.

BRIEF DESCRIPTION OF THE DRAWINGS

FIG. 3 shows a software system connection table;

FIG. 6 shows a hierarchical configuration for a first and second software part.

DETAILED DESCRIPTION OF THE INVENTION

This invention describes a software system for developing a software simulation model in which it is possible to maintain structural correspondence between the software model and the hardware. In this system hardware components are represented by software components called parts, hardware connections are represented by software objects called connections. Through the use of another software object called a plug, a software connection for a specific interface is established between two parts. The method then for constructing a software model is analogous to creating the hardware, that is, larger components are created by connecting together smaller components.

The present invention utilizes a type-safe structure and process to ensure that the interface connections between the two software parts follows the same protocol concerning data types, the method, and the sequence by which arguments are passed between the two.

Figure 1:
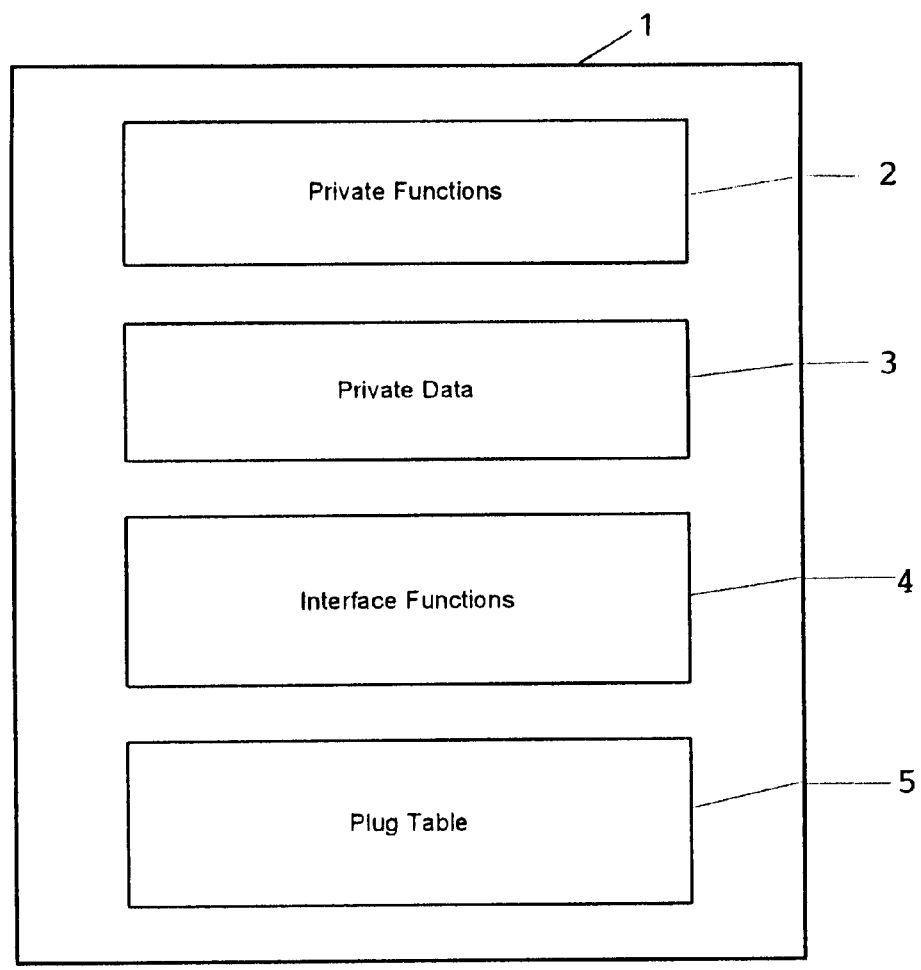
FIG. 1 is a diagram of a software component or part.

FIG. 1 shows the contents of the software component hereafter called part (1). A part comprises its private code (2) and private data (3) functions. These data and functions are not accessible to code functions residing in another part. A set of interface code functions (4) are accessible to software functions residing in another part. The invention involves data structures and methods by which these interface functions are made available to other parts.

Figure 2A:
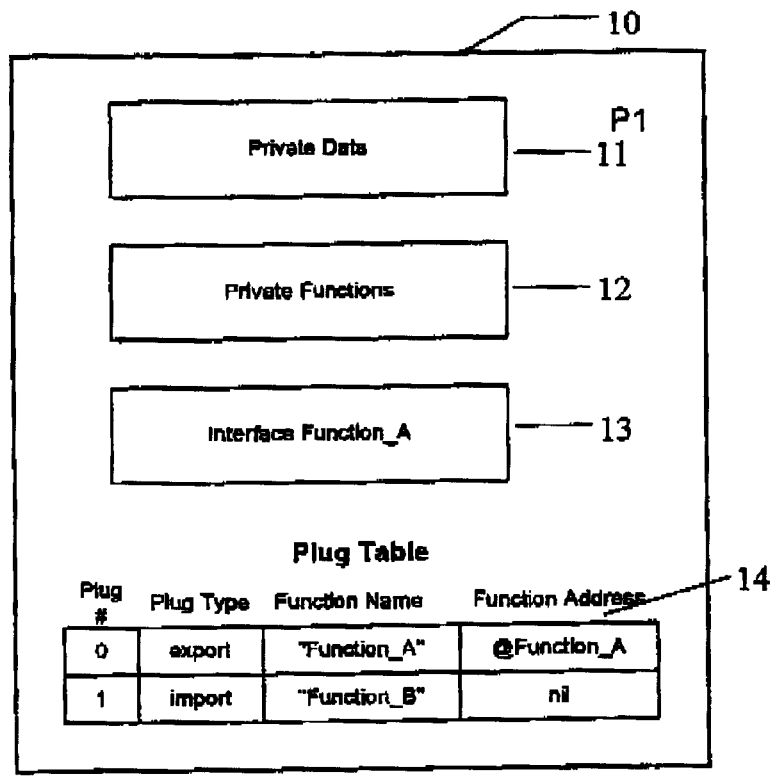
FIGS. 2a and 2b are diagrams showing two unconnected software parts.
Figure 2B:
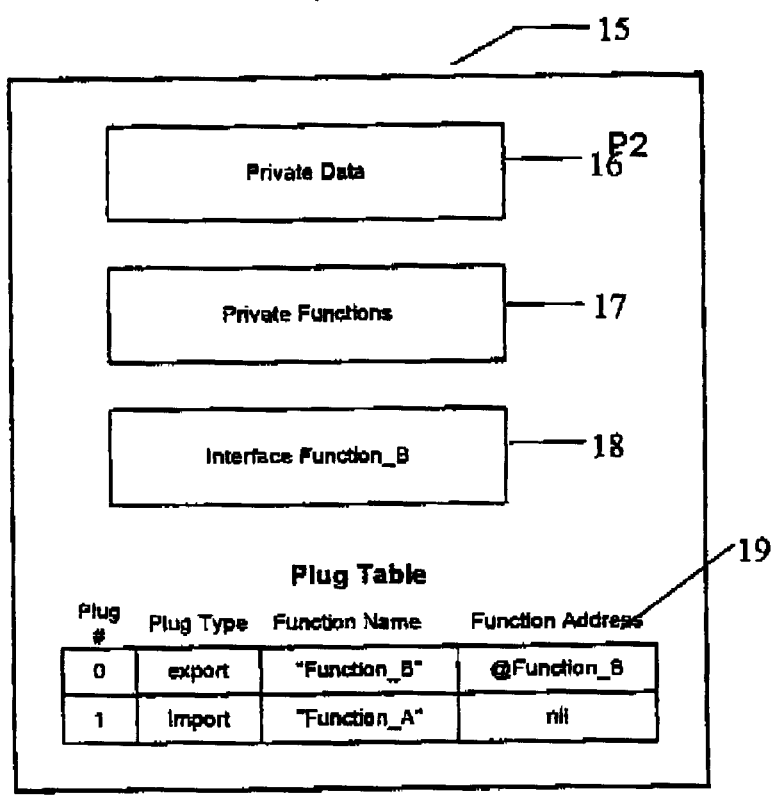

The plug table (5) is the data structure through which a part publishes or advertises to other parts within the software system the existence of is interface functions. FIGS. 2a and 2b show the details of two specific parts: $P_1$ (10) and $P_2$ (15).

The private data and functions of $P_1$ (11, 12) and $P_2$ (16, 17) are not of interest in this discussion and will be ignored. Part $P_1$ contains one interface function called Function_A (13) that it wishes to make available to other parts. Part $P_2$ contains one software interface function Function_B (18) that it wishes to make available. Each row of the plug table (14 in part $P_1$ and 19 in part $P_2$) is called a plug and is assigned a number called the plug number. The only restriction on plug numbers is that they are unique within a given table.

The first row in the plug table (14) relates to Plug #0 and contains an entry for Function_A. Column 1 contains the plug number. Column 2 contains the plug type. The type export indicates that this part contains an implementation of Function_A and that it wishes to "export" that function and make it accessible to other parts. The next column contains the function name. The last column contains the memory address of Function_A.

The second row in table (14) relates to Plug #1 and contains the plug entry for Function_B. Since Function_B is not implemented within part $P_1$ its implementation must be "imported" from another part, so the plug type is marked as type 'import'. The address for Function$_{13}$ B is nil or unknown at the time $P_1$ is initialized.

FIG. 2b shows a similar set of tables for plug #0 and #1 for part $P_2$ except that $P_2$ imports Function_A and exports Function_B. Therefore the plug table (19) contains an address for Function_B whereas the address for Function_A is nil.

Given the two parts $P_1$ and $P_2$, it is desired that they be "connected" in such a way that whenever software in $P_1$ wishes to execute Function_B, control is transferred to the implementation of Function_B contained in $P_2$. Likewise whenever software in $P_2$ wishes to execute Function_A, control is transferred to the implementation of Function_A contained in $P_1$. In order to accomplish this, the system provides a software function called Create_Connection which is called with the following parameters: left part, left plug number, right part, right plug number, where left and right refer to the left and right end of the connection.

FIG. 3 shows the system connection table (100). Each row of the table lists a permitted connection type based on the pair (left plug type, right plug type). For each permitted type of connection, the table also lists the address of a "connection function" that contains the code required for creating a connection of the specified type. The table contains four entries creating a connection between import and export plugs. The connection function is called Import_Export_Connection_Function.

The steps involved in Create_Connection are summarized as follows:

For the pairs (left part, left plug number) and (right part, right plug number), connect (left part, left plug number) and (right part, right plug number) together as follows:
1. Find left plug type for left plug number from the plug table in left part.
2. Find right plug type for right plug number from the plug table in the right part.
3. Search the system connection table for a match on (left plug type, right plug type).
4. If a match is found, call the connection function specified.with the parameters: left part, left plug number, right part, right plug number, but if a match is not found, end in error.

The following lists the steps for the Import_Export_Connection_Function. In all the following steps, the left plug table is accessed using the left plug number to select the row, and the right plug table is accessed using the right plug number to select the row,
1. Find the left function name from the plug table in the left part.
2. Find the right function name from the plug table in the right part.
3. If the names match, proceed to step 4, but if the names do not match, end in error.
4. If the left plug type is export, copy the function address from the left plug table to the right plug table. If the left plug type is import, copy the function address from the right plug table to the left plug table.

Figure 4A:
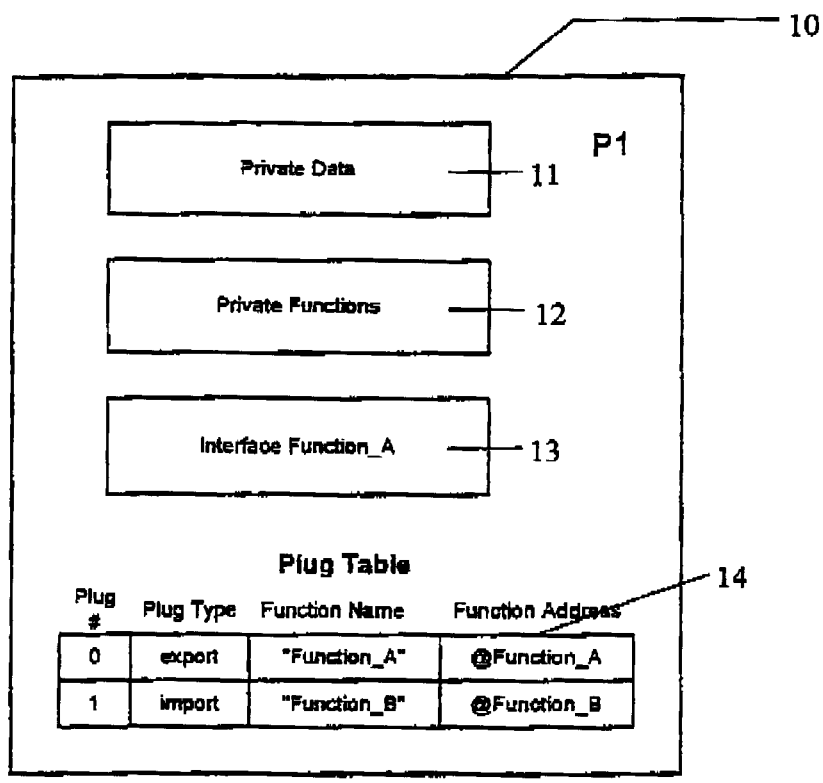
FIGS. 4a and 4b are diagrams showing the software parts connected to one another.
Figure 4B:
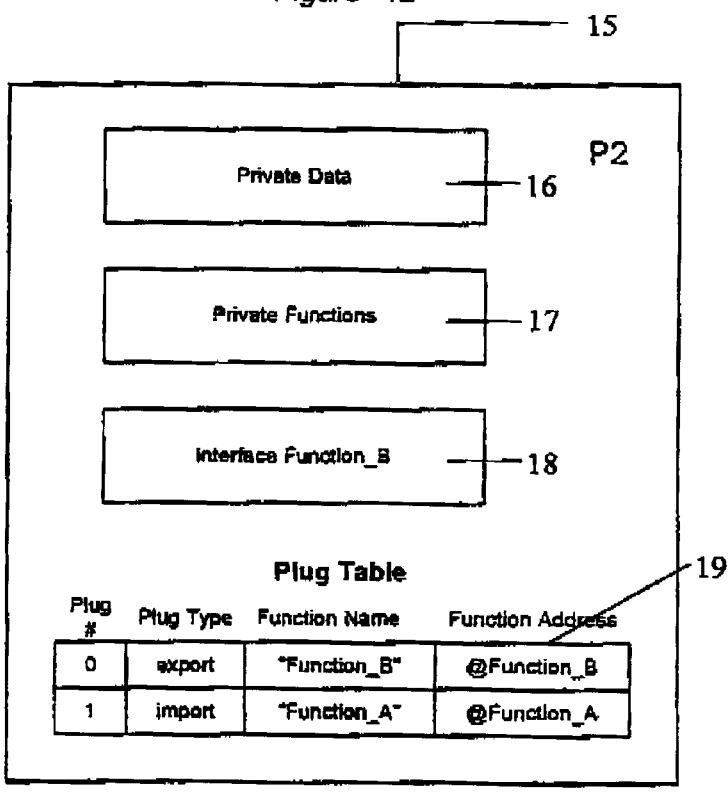
Figure 5:
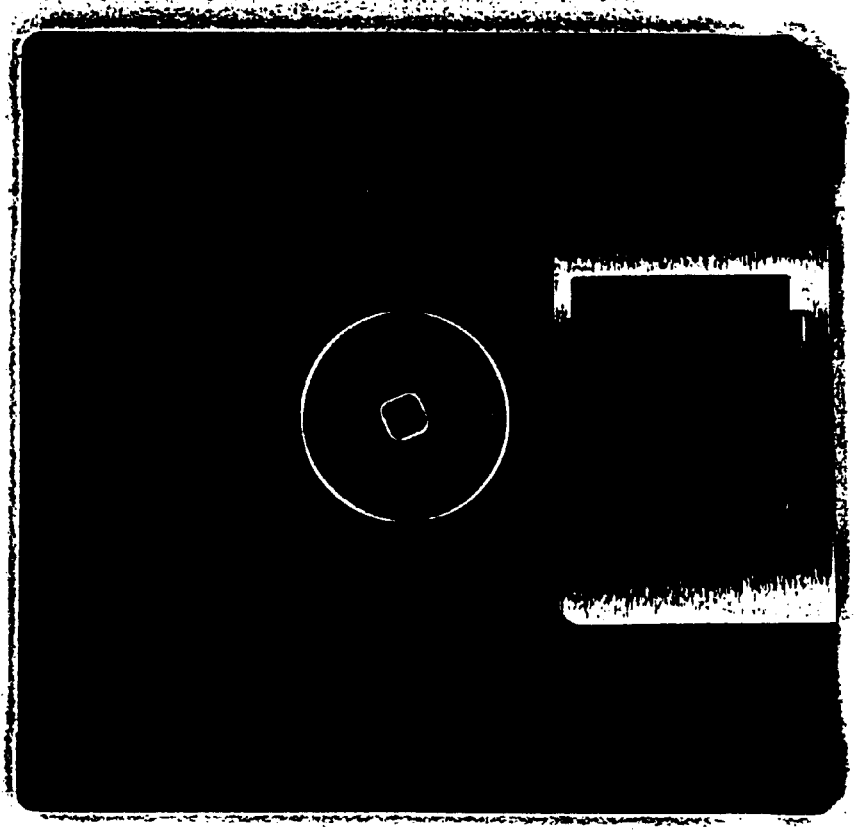
FIG. 5 shows a magnetic disc representing the plugs and connectors of the present invention.

Given the example shown FIG. 2 before a connection is made, FIG. 4 shows the results after a connection is made. The same numbers are used for each of the element of $P_1$ and $P_2$ as are used in FIGS. 2a and 2b.

Disconnection is supported by extending the Import_Export_Connection_Function to include a parameter which indicates whether a connection or a disconnection is being performed. In the case of a disconnection, the following steps are then performed:
1. If the left plug type is import, set the left plug's function address to nil.
2. If the right plug type is import, set the right plug's function address to nil.

When a connection is complete, the software function is available for export to other parts in the software hierarchy. The connection process is repeated recursively when smaller software parts are defined inside of larger parts, which is the way complex software systems are typically built. FIG. 6 shows a first part $P_1$ 300 containing private data 301 and private functions 302, interface Function A 303 and plug table 304. Pat $P_3$ contains private data 306 and private fictions 307 along with plug table 308. In addition, $P_3$ has an embedded function shown as part $P_2$ 310. This embedded part $P_2$ 310 includes a private data 311 and private functions 312 along with interface Function_B 313 and plug table 314. As shown by the lines 316, 318, the system initializes the software parts from the lowest level $P_2$ of the hierarchy to the highest level so that the largest or most enclosing part $P_3$ will be the last to be initialized. Therefore, the plug tables are built from the smallest part $P_2$ 310 to the largest part $P_3$ 305. The address is copied from plug table 314 to plug table 308 with part $P_3$ as part of the initialization. Thus, when this portion of the system is done initializing, the largest part $P_3$ will have an address of function B in its plug table 308, thereby giving a direct address to the plug table 304 in part $P_1$ as shown by lines 320 and 322 or to any other part in the hierarchy that it wants to call and be connected, regardless of the location of the function with the software architecture. The connection and disconnection functions Import_Export_Connection_Function are performed stepwise in the same manner as previously described in relation to FIGS. 2 and 4.

A compound plug allows the bundling together of multiple import and export plugs and allows a connection between two such bundles to be carried out through a single connector as opposed to having separate connectors for each plug. Referring now to FIG. 3, the Connection Table would be modified to include another entry where the left plug type and the right plug type are both marked as compound, and a new address function, called Compound_Connection is added. This function takes one left plug and one right plug at a time and researches the connector using the algorithm Create_Connection. It repeats this step for each left and each right plug. Furthermore, the compound plug can include other compound plugs. The entire procedure continues until all connections are made.

A splitter plug may be used in situations where an export plug is connected to multiple import plugs. As previously discussed, a single copy step is used to copy a function address from the export side to the import side. However, with a splitter plug, the function address is copied from a single export plug to multiple entries on the import side. Referring again to FIG. 3, the Connection Table would be modified to include another entry in which the import is replaced with a splitter plug along with a corresponding connection function address as Splitter_Connection function. The function receives a list of multiple plugs for import whereupon it copies the export to each one of the import plugs.

This invention can be used by manufacturers of personal computers, entry servers, and enterprise servers, developers of operating systems, developers of software for networking and applications as well and service providers. It finds particular utility in modeling of a VLSI hardware chip which contains a large number of fairly sophisticated hardware components. Each hardware component can be mimicked by a software model, written in microcode much more quickly than the time required to complete the hardware component. The invention also involves the use of the plugs can be used without a corresponding connection to access the part interface.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A system for software modeling of hardware architecture including:
   a) a software part corresponding to an individual component of the hardware architecture, said software part including a set of interface code functions;
   b) a data structure associated with the software part comprising a plug table containing one or more plugs, each plug including an assigned plug identifier, an export plug, the name of a given interface code function accessed by the plug, and an address for the given function if the function is available for export from the software part;
   c) a second software part, a plug table associated with the second software part and containing one or more plugs including an import plug; and
   d) a connector joining the export plug in the plug table of the first software part with an import plug in the plug table of the second software part for transfer of the code function from the first software part into the second software part,
      wherein the connector has a left part and a right part; the system further including a Create_Connection function having the parameters left part, left plug number, right part and right plug number, and a connection function consisting of Import_Export_Connection_Function.

2. The system according to claim 1 further including a disconnect function that sets the import plug to nil.

3. The system according to claim 1 further including a connection table listing the address of said connection function.

4. The system according to claim 3 further including a compound plug, said connection table including a corresponding address function Compound_Connection.

5. The system according to claim 3 further including a splitter plug, and said connection table includes a corresponding address function Splitter Connection.

6. A system comprising a left software part and a right software part and means for creating a connection between the left part and the right part through an import plug, an export plug and a connector, comprising:
   a) a plug table associated with the left software part and including a left plug number for the left plug type;
   b) a plug table associated with the right software part and including a right plug number for the right plug type;
   c) a connection table associated with the connector containing data defining the left plug type and the right plug type and an address of a connection function;
   d) a protocol for searching the connection table for an import/export match between the plugs corresponding to the part location of a function address, and
   e) means for executing a connection function if a match is found or terminating the connection function if a match is not found.

7. The system according to claim 6 wherein said connection function consists of Inport_Export_Connection_Function.

8. The system according to claim 7 wherein the Inport_Export_Connection_Function is extended to perform a disconnection by setting the address of the import plug type to nil.

9. The system according to claim 7 further including a Create_Connection function which is called with the following parameters: left part left plug number, right part, right plus number where left and right refer to the left and right ends of the created connection.

10. A process for creating a connection between a left software part and the right software part through an import plug, an export plug and a connector, comprising the steps of:
   a) finding a left plug type for the left plug number from a plug table associated with the left software part;
   b) finding a right plug number for the right plug type plug table associated with the right software part;
   c) searching a connection table associated with the connector containing data defining the left plug type and the right plug type and an address of a connection function for an import/export match between the plugs corresponding to the part location of a function address, and
   d) if a match is found, executing a connection function and if a match is not found terminating the connection function.

* * * * *